United States Patent
Yu et al.

(10) Patent No.: US 8,645,370 B2
(45) Date of Patent: Feb. 4, 2014

(54) SCORING RELEVANCE OF A DOCUMENT BASED ON IMAGE TEXT

(75) Inventors: Qing Yu, Beijing (CN); Shuming Shi, Beijing (CN); Zhiwei Li, Beijing (CN); Ji-Rong Wen, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/972,259

(22) Filed: Dec. 17, 2010

(65) Prior Publication Data
US 2011/0087660 A1 Apr. 14, 2011

Related U.S. Application Data

(62) Division of application No. 11/681,161, filed on Mar. 1, 2007, now Pat. No. 7,877,384.

(51) Int. Cl.
G06F 17/30 (2006.01)

(52) U.S. Cl.
USPC .......................................... 707/728; 707/748

(58) Field of Classification Search
USPC .......................................... 707/728, 769, 748
See application file for complete search history.

(56) References Cited

U.S. PATENT DOCUMENTS

| | | | |
|---|---|---|---|
| 6,842,761 B2 | 1/2005 | Diamond et al. | |
| 7,051,019 B1 | 5/2006 | Land et al. | |
| 7,065,520 B2 * | 6/2006 | Langford | 707/769 |
| 7,130,849 B2 | 10/2006 | Yayoi et al. | |
| 7,398,269 B2 | 7/2008 | Shanahan et al. | |
| 7,877,384 B2 | 1/2011 | Yu et al. | |
| 2005/0165763 A1 | 7/2005 | Li et al. | |
| 2005/0246623 A1 | 11/2005 | Ma et al. | |
| 2005/0251496 A1 | 11/2005 | DeCoste et al. | |
| 2006/0026191 A1 | 2/2006 | McSherry | |
| 2006/0095430 A1 | 5/2006 | Zeng et al. | |
| 2006/0106784 A1 | 5/2006 | Alpha | |
| 2006/0242139 A1 | 10/2006 | Butterfield et al. | |
| 2008/0215561 A1 | 9/2008 | Yu et al. | |

OTHER PUBLICATIONS

Benitez, Ana B. et al., "Using Relevance Feedback in Content-Based Image Metasearch," IEEE Internet Computing, Jul.-Aug. 1998, © 1998, pp. 59-69.

Brin, Sergey and Lawrence Page, "The Anatomy of a Large-Scale Hypertextual Web Search Engine," WWW-7, 1998.

Cai, Deng et al., "Hierarchical Clustering of WWW Image Search Results Using Visual, Textual and Link Information," MM'04, Oct. 10-16, 2004, New York, New York, © 2004 ACM.

Dziadosz, Susan and Raman Chandrasekar, "Do Thumbnail Previews Help Users Make Better Relevance Decisions About Web Search Results?," SIGIR'02, Aug. 11-15, 2002, Tampere, Finland, ACM.

Frankel, Charles et al., "WebSeer: An Image Search Engine for the World Wide Web," Aug. 1, 1996, The University of Chicago Computer Science Department Technical Report 96-14.

(Continued)

*Primary Examiner* — Huawen Peng
(74) *Attorney, Agent, or Firm* — Perkins Coie LLP (57) ABSTRACT

A method and system for determining relevance of a document having text and images to a text string is provided. A scoring system identifies image text associated with an image of the document. The scoring system calculates an image score indicating relevance of the image text to the text string. The image score may be used in many applications, such as searching, summary generation, and document classification, image search, and image classification.

17 Claims, 8 Drawing Sheets

(56) References Cited

OTHER PUBLICATIONS

Hu, Jianying and Amit Bagga, "Categorizing Images in Web Documents," Document Recognition and Retrieval X, Proceedings of SPIE/IS&T, vol. 5010, Santa Clara, CA, Jan. 2003, pp. 136-143.

Hu, Jianying and Amit Bagga, "Functionality-Based Web Image Categorization," WWW 2003, May 20-24, 2003, Budapest, Hungary, ACM.

Ivory, Melody Y. and Hearst, Marti A., "Improving Web Site Design," IEEE Internet Computing, Mar.-Apr. 2002, © 2002 IEEE, pp. 56-63.

Jarvelin, Kalervo and Jaana Kekalainen, "Cumulated Gain-Based Evaluation of IR Techniques," ACM Transactions on Information Systems, vol. 20, No. 4, Oct. 2002, pp. 422-446.

Joachims, Thorsten, "Optimizing Search Engines using Clickthrough Data," SIGKDD'02, Edmonton, Alberta, Canada, © 2002 ACM.

Kobayashi, Mei and Koichi Takeda, "Information Retrieval on the Web," ACM Computing Surveys, vol. 32, No. 2, Jun. 2000, © 2001 ACM, pp. 144-173.

Lempel, Ronny and Aya Soffer, "PicASHOW: Pictorial Authority Search by Hyperlinks On the Web," ACM Transactions on Information Systems, vol. 20, No. 1, Jan. 2002, pp. 1-24.

Page, L. et al., "The PageRank Citation Ranking: Bringing Order to the Web," Jan. 29, 1998, Stanford University Technical Report, pp. 1-17.

Robertson, S.E. et al., "Okapi at TREC-7: automatic ad hoc, filtering, VLC and interactive track," In Proceedings of TREC 1999.

Robertson, Stephen, Hugo Zaragoza and Michael Taylor, "Simple BM25 Extension to Multiple Weighted Fields," CIKM'04, Washington DC, © 2004 ACM, pp. 42-49.

Shaw, Joseph A. and Edward A. Fox, "Combination of Multiple Searches," Second Text Retrieval Conference, pp. 243-249, 1994.

Smith, John, R., and Chang, Shih-Fu, "VisualSEEk: A fully automated content-based image query system," In Proceedings of ACM Multimedia, Boston, MA, Nov. 20, 1996.

Song, Ruihua et al., "Learning Block Importance Models for Web Pages," WWW 2004, New York, pp. 203-211.

Woodruff, Allison et al., "Using Thumbnails to Search the Web," Proceedings of SIGCHI, Mar. 31-Apr. 4, 2001, Seattle, Washington, pp. 198-205, © 2001 ACM.

\* cited by examiner

SCORING RELEVANCE OF A DOCUMENT BASED ON IMAGE TEXT

CROSS REFERENCE TO RELATED APPLICATION

This application is a Divisional of U.S. patent application Ser. No. 11/681,161, filed on Mar. 1, 2007, now U.S. Pat. No. 7,877,384 issued Jan. 25, 2011, and entitled "SCORING RELEVANCE OF A DOCUMENT BASED ON IMAGE TEXT," which is incorporated herein in its entirety by reference.

BACKGROUND

Many search engine services, such as Google and Overture, provide for searching for information that is accessible via the Internet. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service identifies web pages that may be related to the search request based on how well the keywords of a web page match the words of the query. The search engine service may then display to the user links to the identified web pages.

When the links are displayed, the search engine service may order the links to the web pages based on a ranking of the web pages that may be determined by their relevance to the query, popularity, importance, and/or some other measure. Relevance of a web page to a query may be determined using various techniques including a term frequency by inverse document frequency ("tf*idf") metric, a cosine similarity metric, and so on. These techniques for determining relevance typically provide a text relevance score that is based on comparison of text of the web page to text of the query. Popularity of a web page may be derived from analysis of web page access information (e.g., number of different users who access a web page). Importance of a web page can be determined using various techniques including those described below. These techniques for determining importance may be considered as static in that they are based on the static structure of web pages and their links (i.e., a web graph) at some point in time. These techniques provide a static score to each web page that indicates its importance relative to other web pages.

Three well-known techniques for determining importance of a web page are PageRank, HITS ("Hyperlink-Induced Topic Search"), and DirectHIT. PageRank is based on the principle that web pages will have links to (i.e., "out links") important web pages. Thus, the importance of a web page is based on the number and importance of other web pages that link to that web page (i.e., "in links"). In a simple form, the links between web pages can be represented by adjacency matrix A, where $A_{ij}$ represents the number of out links from web page i to web page j. The importance score $w_j$ for web page j can be represented by the following equation:

$$w_j = \Sigma_i A_{ij} w_i$$

This equation can be solved by iterative calculations based on the following equation:

$$A^T w = w$$

where w is the vector of importance scores for the web pages and is the principal eigenvector of $A^T$.

Web pages are multimedia documents that include various media types such as text, images, video, and audio. The non-textual media types play an important role in conveying the information content of a web page to a user. Images in particular play an important role in conveying information to a user. The authors of web pages may prefer to express information as an image, rather than as text, because as the adage says, "a picture is worth a thousand words." The authors may also prefer to use appealing images, rather than text, because the resulting web pages may be more attractive and may be perceived to be of higher quality. As described above, typical techniques for ranking web pages factor in textual relevance and static importance. These techniques, however, typically do not factor in the information associated with or based on the non-textual media types.

SUMMARY

A method and system for determining relevance of a document having text and images to a text string is provided. A scoring system identifies text associated with an image of the document, referred to as "image text." The scoring system determines the relevance of the image text to the text string, referred to as an "image score" because it is based on image text of an image of the document. The scoring system then uses the image score as an indication of the relevance of the document to the text string. The image score may be used in many applications. For example, a search engine may rank web pages of a search result based on their image scores. The scoring system can thus take advantage of information content associated with images in determining relevance of a document to a text string.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for determining relevance of a document having text and images to a text string is provided. In one embodiment, a scoring system identifies text associated with an image of the document, referred to as "image text." For example, when the document is a web page, the image text of an image of the web page may include text surrounding the image and metadata associated with the image. This metadata may include the text of the URL of the image, text to be displayed in place of an inaccessible image (e.g., ALT text of an HTML document), and so on. The scoring system determines the relevance of the image text to the text string, referred to as an "image score" because it is based on image text of an image of the document. For example, the ranking system may determine relevance of web pages of a search result to a search request based on a comparison of image text of images of the web pages to the search request. The scoring system may use various techniques to generate the image score such as a term frequency by inverse document frequency metric. The scoring system then uses the image score as an indication of the relevance of the document to the text string. The image score may be used in many applications. For example, a search engine may rank web pages of a search result based on their image scores. The search engine may combine the image score with a text relevance score and a static ranking score to provide the overall ranking. As another example, a document summary system may factor in an image score in determining whether an image of a document should be included in a summary of the document. As another example, a document classification system may use an image score derived from comparison of image text to a textual description of a class as an indication of similarity between the document and the class. As another example, a vertical search system may factor in an image score to search for items, such as products or news stories. In this way, the scoring system can take advantage of information content associated with images in determining relevance of a document to a text string. In the following, the scoring system is described primarily in reference to one embodiment that is used for ranking web pages. One skilled in the art will appreciate that the scoring system may be used in various other applications.

In one embodiment, the scoring system may derive an overall image score for a document based on the image scores for each image of the document. The scoring system identifies the image text of each image and generates an image score for each image. The scoring system then generates an overall image score for the document that may be the sum of the individual image scores, the maximum of the individual image scores, a weighted sum of the individual image scores, an average of the image scores, and so on. For example, if a web page contains five images, the scoring system generates five image scores. The scoring system may then weight each image score by effectively increasing the higher image scores and decreasing the lower image scores in a non-linear manner so that many low image scores will not overwhelm a large image score.

In one embodiment, the scoring system may factor into an image score the importance of the image to the document. The importance of an image to a document can vary widely. For example, a web page may contain a large image positioned at the top center of the web page and small images located at the bottom of the web page representing links to other web pages. In such a case, the large image positioned at the center may be more important to the web page. The image text of the more important image may be more representative of the overall topic of the web page than image text of an unimportant image. The scoring system may adjust the image score of an image based on the importance of the image to the web page.

In one embodiment, the scoring system generates overall image scores for each web page for use by a search engine in ranking the web pages. To improve performance when a search request is submitted, the scoring system may perform various preprocessing functions prior to a search request being submitted. After a web page is crawled, the scoring system may extract the image text for each image of each web page and store the image text in association with the web page in an image data store. When the search engine ranks web pages of a search result, it can access the image text of the image data store without the overhead of having to extract the image text in real time. After a web page is crawled, the scoring system may also calculate the importance of each image to the web page and store the results in the image data store. The search engine can then factor in the importance of an image without having to calculate the importance in real time. As described below in detail, the scoring system may use a supervised learning technique to learn a function for determining the importance of an image to a document.

A. Image Text Extraction

The scoring system extracts image text and indexes the image text by web page for rapid retrieval when calculating the image scores. The scoring system can use text of the web page surrounding an image and text of metadata associated with the image. Some research has indicated that that ALT text, URL text, anchor text (if the image itself is a link), and surrounding text from an image can be treated as approximate text presentation of the image. (See Cai, D., He, X., Li, Z., Ma, W. Y., and Wen, J. R., "Hierarchical Clustering of WWW Image Search Results Using Visual, Textual and Link Information," Proc. 12th ACM Int'l Conf. on Multimedia, 2004; Coelho, T. A. S., Calado, P. P., Souza, L. V., Ribeiro-Neto, B., and Muntz, R., "Image Retrieval Using Multiple Evidence Ranking," IEEE Trans. Knowl. Data Eng., 2004; Frankel, C., Swain, M., and Athitsos, V., "WebSeer: An Image Search Engine for the World Wide Web," University of Chicago Technical Report TR96-14, 1996; and Lempel, R., and Soffer, A., "PicASHOW: Pictorial Authority Search by Hyperlinks on the Web," Proc. 10th Int'l World Wide Web Conf., pp. 438-448, Hong Kong, China, 2001.) The scoring system represents the image text as a structured document with a field for each type of text (e.g., ALT text and anchor text).

The scoring system may use various techniques for identifying surrounding text of an image. For example, one technique may render the web page in memory and analyze its layout to identify the surrounding text based on distance from the image. Another technique may use rules to identify surrounding text from the HTML document representing a web page (e.g., passages consisting of 20 terms before or after the image). In one embodiment, the scoring system uses a Document Object Model ("DOM") based technique for identifying surrounding text. The DOM represents a document as a tree of nodes. The scoring system builds a tree by adding nodes corresponding to the HTML tags, text blocks, and objects of the HTML document. The scoring system ensures that the nearest sibling nodes represent physically adjacent portions of the HTML document. The scoring system uses a growing algorithm to identify the surrounding text. The scoring system starts at the node of the image and checks surrounding nodes until a text node is found. The scoring system may also use a DOM parsing technique that focuses on dealing with table elements when identifying surrounding text.

In one embodiment, the scoring system discards images that are not important to help improve the accuracy of the scoring. When web pages are being crawled, the scoring system can remove images that are too small to likely be important. The scoring system may use the absolute image size as indicated by the web page. If the size is too small, the scoring system simply discards the image without retrieving it. When the importance of images to their web pages is being calculated, the scoring system may discard images whose importance is below a threshold.

B. Image Relevance Score

The scoring system may use various information retrieval ("IR") techniques to calculate an image relevance score for an image and use that image relevance score to calculate an image score for the image. The image relevance score is a scoring of the relevance of image text to a text string. Since image text is represented as a structured document, various IR techniques for structured document retrieval may be used to score relevance. (See Fox, E. A., and Shaw, J. A., "Combination of Multiple Searches," Proc. Second Text REtrieval Conference (TREC-2), pp. 243-249, 1994; and Robertson, S., Zaragoza, H., and Taylor, M., "Simple BM25 Extension to Multiple Weighted Fields," Proc. Conf. on Information and Knowledge Management (CIKM '04), 2004.) The scoring system could calculate a field relevance score for each field of an image and then linearly combine the field relevance to give the image relevance score as represented by the following equation:

$$R = \sum_{i=1}^{m} w_i \cdot R_i \qquad (1)$$

where $F_i$ represents the field i, $w_i$ represents the weight of field $F_i$, and $R_i$ is the field relevance score of field $F_i$ with respect to the text string. The scoring system represents the field relevance score using a BM25 formula. (See Robertson, S. E., Walker, S., and Beaulieu, M., "Okapi at TREC-7: Automatic Ad-hoc, Filtering, VLC and Interactive Track," Proc. Seventh Text REtrieval Conference (TREC-7), 1999.) The field relevance score is represented by the following equation:

$$Ri = \sum_{t \in Q} \frac{(k_1 + 1) \cdot tf(t, F_i)}{k_1 \cdot \left((1-b) + b \cdot \frac{dl_i}{avdl_i}\right) + tf(t, F_i)} \cdot W(t) \qquad (2)$$

where tf represents the occurrence frequency of the term t within field $F_i$, $dl_i$ and $avdl_i$ represent the document length and average document length of field $F_i$, $k_1$ and b represent two parameters, and W(t) represents term weight. The scoring system calculates term weight using the following equation:

$$W(t) = \log \frac{N - df(t) + 0.5}{df(t)} \qquad (3)$$

where N represents the total number of fields of all contained images in the collection and df (t) represents the number of documents containing the term t.

C. Image Importance

Because images of web pages vary greatly in terms of their functionality and importance, the scoring system determines the importance of an image to its web page and factors the importance into the image score of an image. Images of web pages may include topical images (i.e., images helping to clarify the main topic of a web page), advertising images, banners, logos, formatting images, and so on. Some images carry more detailed information about the topic of their web page and are thus more important to the web page. In contrast, some images are inserted into a web page only for decoration, advertisement, or navigation, and therefore are less important to the web page.

The scoring system generates an image importance score to indicate the importance of an image to a web page. The scoring system may use a scoring function to generate the image importance score based on various features of the image. The features of an image may include image level features, page level features, and site level features. Image level features are derived from the image itself, the page level features are derived from the relationship of the image to its web page, and the site level features are derived from the relationship of the image to the web site of its web page. The following table lists example features.

| Feature Level | Feature | Description |
| --- | --- | --- |
| Image Level | Size | Area of the image |
| | Width/height ratio | Ratio of the width of the image to the height of the image |
| | Blurriness | Degree of blur of the image |
| | Contrast | Contrast within the image |
| | Colorfulness | Measure of color within the image |
| | Face | Flag indicating whether the image contains a face |
| | Photo vs. graphic | Flag indicating whether the image is a photograph or computer generated graphic |
| Page Level | Relative position X | Relative horizontal position of the image within the web page |
| | Relative position Y | Relative vertical position of the image within the web page |
| | Relative size | Percentage of the web page occupied by the image |
| | Relative width/height ratio | Ratio of the width-to-height ratio of the image to the width-to-height ratio of the page |
| Site Level | Inner site | Flag indicating whether the image is contained within the web site of the web page |
| | Frequency in site | Number of times the image appears on different web pages of the web site of the web page |

The scoring system may use various techniques to calculate the image importance scores such as rule-based techniques or a function generated using supervised learning techniques. Rule-based techniques use empirical rules for combining the contribution of each feature to the image importance score. Supervised learning techniques learn a function for calculating image importance scores based on training data of the features of each image along with a label indicating importance of each image. Each labeled image can be expressed as $(x_{ij}, y_{ij})$ where $x_{ij}$ represents the extracted features of image i on page j and $y_{ij}$ represents its labeled image importance score. The scoring system learns a function such that that the following equation is minimized:

$$\Sigma_{(x,y) \in T} |f(x_{i,j}) - y_{i,j}|^2 \qquad (4)$$

When the image importance is a real value, it can be difficult for a person to assign real-value image importance scores to images of a web page. In contrast, it is easier for a person to identify which image is the most important image and which is less important than others and to classify images within a page into categories representing different degrees of importance. Thus, the scoring system uses labels that are in the range of 0-2 with 0 indicating unimportant, 1 indicating mildly important, and 2 indicating important.

The scoring system may use various learning techniques to learn the importance function including a ranking support vector machine, neural network, and so on. In one embodiment, the scoring system uses a ranking SVM to learn the importance function. (See, Joachims, T., "Optimizing Search Engines Using Clickthrough Data," Proc. 8$^{th}$ ACM SIGKDD Conf. on Knowledge Discovery and Data Mining, 2002.) A ranking SVM computes importance I, using linear model, according to the following equation:

$$I = w^T \cdot x \qquad (5)$$

where w represents a vector of weights. The importance score I represents the signed distance of a feature point to a hyperplane with normal vector w, which can be used for ranking. The weight vector w can be represented by the following equation $$w = \Sigma_{(x,y) \in T} \alpha_{i,j} \cdot y_{i,j} \cdot x_{i,j} \qquad (6)$$

where $\alpha_{i,j}$ is learned by the ranking SVM, and the label y represents the importance degree and is treated as the ranking of each image within the page.

D. Overall Image Score

In one embodiment, the scoring system may combine the image scores of the images of a web page using various techniques to give the overall image score of the web page. The scoring system calculates the image score of an image according to the following equation:

$$S_i = R_i \cdot I_i \qquad (7)$$

where $S_i$ represents the image score of image i, $R_i$ represents the image relevance score of image i, and $I_i$ represents the image importance score of image i. The scoring system may generate an overall image score for a web page by summing the image scores of the images of the web page as represented by the following equation:

$$S_{image} = \sum_i (I_i \cdot R_i) \qquad (8)$$

where $S_{image}$ represents the overall image score. This equation represents the inner product of the page's image relevance score vector R and image importance score vector I.

Alternatively, the scoring system may set the overall image score of a web page to the maximum of the image scores of the images of the web page as represented by the following equation:

$$S_{image} = \max_i (I_i \cdot R_i) \qquad (9)$$

Alternatively, the scoring system may discount lower image scores because the information content of the image text may be covered by the image text of an image with a higher image score and because many low image scores may overwhelm a large image score. The scoring system discounts each image score and then sums these discounted scores to give an overall image score as represented by the following equation:

$$S_{image} = \sum_i \text{discount}(i) \cdot I_i \cdot R_i \qquad (10)$$

where discount(i) represents a decreasing function with limit zero. The scoring system may use various discount functions including linear or non-linear discount functions. A non-linear discount function is represented by the following equation:

$$\text{discount}(i) = \frac{1}{(l + c \cdot i)^2} \qquad (11)$$

where c is a parameter controlling the degree of discount and i represents the index of the images sorted by descending image score (e.g., the image with the highest image score has an index of 1, the second highest image score has an index of 2, and so on).

E. Ranking Based on Overall Image Score and Other Scores

In one embodiment, the scoring system may combine the overall image score of a web page with others scores to give a total ranking score for the web page. The scoring system may combine the overall image score of a web page with a text score and a static score of the web page as represented by the following equation:

$$S_{total} = \lambda_1 \cdot S_{image} + \lambda_2 \cdot S_{text} + \lambda_3 \cdot S_{static} \qquad (12)$$

where $S_{total}$ represents the total ranking score, $S_{text}$ represents the text score, $S_{static}$ represents the static score, and $\lambda_1 + \lambda_2 + \lambda_3 = 1$. The scoring system may combine the scores in other ways such as by combining the scores non-linearly. For example, the overall image score may be squared and added to the sum of the text and static scores.

Figure 1:
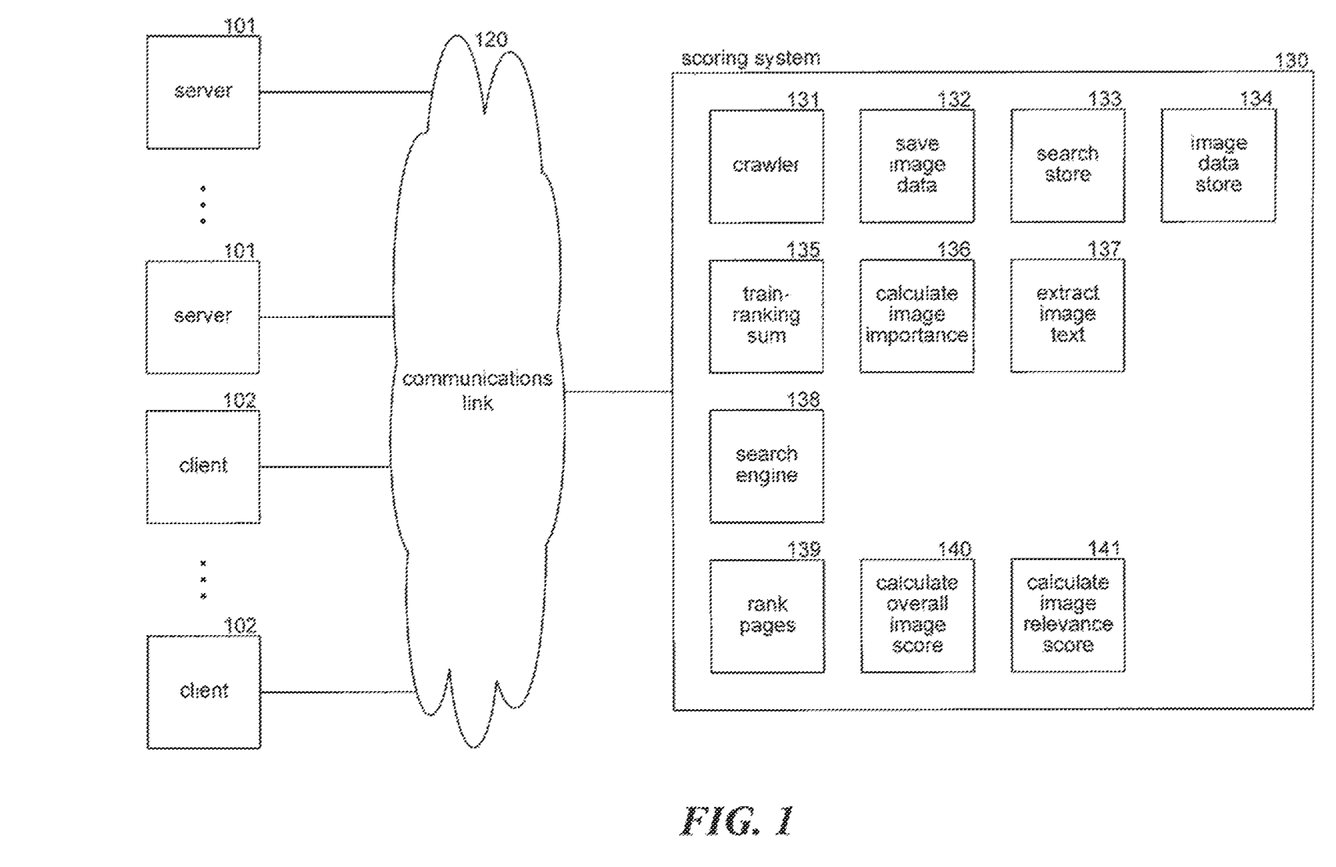
FIG. 1 is a block diagram that illustrates components of the scoring system in one embodiment.

FIG. 1 is a block diagram that illustrates components of the scoring system in one embodiment. The scoring system 130 is connected to servers 101 and clients 102 via communications link 120. The servers may be web servers, and the clients may include browsers for accessing the web pages served by the web servers. The scoring system includes a crawler component 131, a save image data component 132, a search store 133, and an image data store 134. The crawler component crawls the various web servers and creates an index of the web pages in the search store for use by a search engine. The crawler component invokes the save image data component to save image data to be used when generating an image score for a web page. The save image data component invokes a calculate image importance component 136 and an extract image text component 137. The calculate image importance component determines the importance of the images of a web page. The extract image text component extracts the image text for each image of a web page. The save image data component then stores the calculated image importance scores and the extracted image text in the image data store. The scoring system also includes a train ranking SVM component 135 that inputs training data including images of web pages and their labels and trains a ranking support vector machine as an importance function. The scoring system also includes a search engine component 138, a rank pages component 139, a calculate overall image score component 140, and a calculate image relevance score component 141. The search engine component receives a search request and uses the search store to identify web pages that are relevant to the search request. The search engine component then invokes the rank pages component to rank the identified web pages of the search result. The rank pages component invokes the calculate overall image score component to calculate an overall image score for each web page. The calculate overall image score component invokes the calculate image relevance score component to calculate an image relevance score for each image of a web page. The search engine component then may display links to the web pages of the search result ordered based in part on the overall image scores of the web pages.

The computing device on which the scoring system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the scoring system, which means a computer-readable medium that contains the instructions. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the scoring system may be implemented in various operating environments that include personal computers, server computers, hand-held or laptop devices, multiprocessor systems, microprocessor-based systems, programmable consumer electronics, digital cameras, network PCs, minicomputers, mainframe computers, cell phones, personal digital assistants, smart phones, personal computers, programmable consumer electronics, distributed computing environments that include any of the above systems or devices, and so on.

The scoring system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, a separate computing system may crawl the web, save the image data, and train the importance function. Also, the search engine may be implemented on one server that invokes the rank pages component, which may be implemented on a different server. Also, various computations may be performed in real time rather than calculated in advance and stored. For example, the scoring system may defer the calculating of image importance and the extracting of image text until a web page is first ranked. The scoring system may then store the image importance score and extracted image text for subsequent ranking of that web page.

Figure 2:
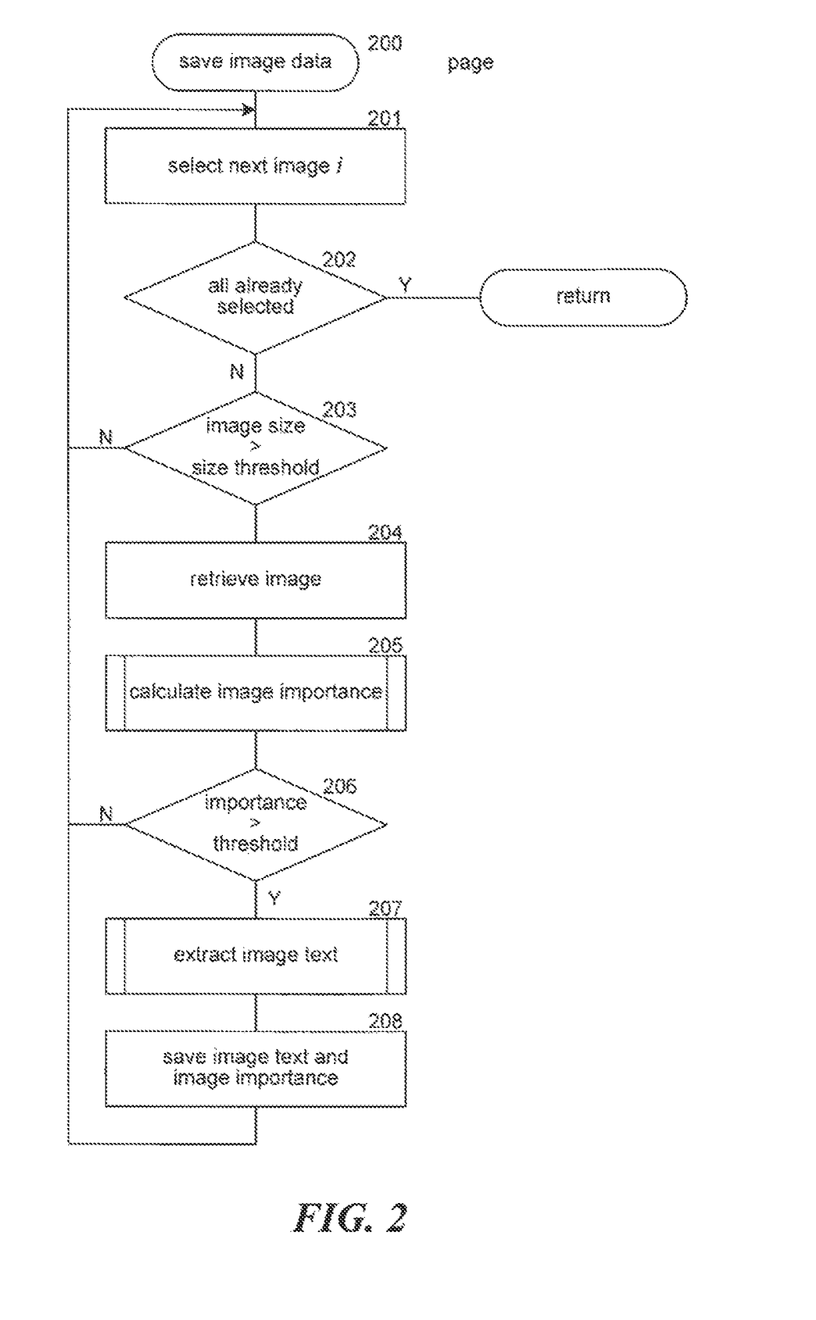
FIG. 2 is a flow diagram that illustrates the processing of the save image data component of the scoring system in one embodiment.

FIG. 2 is a flow diagram that illustrates the processing of the save image data component of the scoring system in one embodiment. The component 200 may be invoked by a crawler component when the crawler component accesses a new web page. The component extracts image text for each image of the web page and calculates an image importance score for each image of the web page. In blocks 201-208, the component loops selecting each image of the web page. In block 201, the component selects the next image of the web page. In decision block 202, if all the images have already been selected, then the component returns, else the component continues at block 203. In decision block 203, if the size of the selected image is greater than a size threshold, then the image may be important and the component continues at block 204, else the image is not important and the component loops to block 201 to select the next image of the web page. In block 204, the component retrieves the selected image of the web page. In block 205, the component invokes the calculate image importance component to calculate an image importance score for the selected image. In decision block 206, if the image importance score is greater than a threshold, then the image is considered important and the component continues at block 207, else the image is considered unimportant and the component loops to block 201 to select the next image. In block 207, the component invokes the extract image text component to extract image text for the selected image. In block 208, the component saves the image text and the image importance score in the image data store and then loops to block 201 to select the next image.

Figure 3:
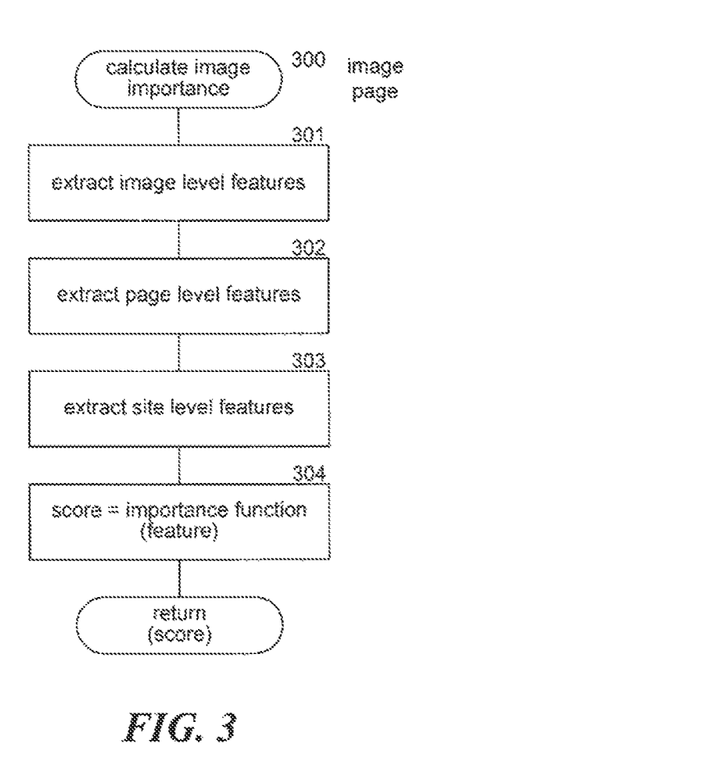
FIG. 3 is a flow diagram that illustrates the processing of the calculate image importance component of the scoring system in one embodiment.

FIG. 3 is a flow diagram that illustrates the processing of the calculate image importance component of the scoring system in one embodiment. The component 300 is passed an image, a web page, and statistical in the web site of the web page extracts the features of the image, and generates an image importance score indicating the importance of the image to the web page. In block 301, the component extracts image level features of the image. In block 302, the component extracts page level features of the image. In block 303, the component extracts site level features of the image. In block 304, the component calculates the score by invoking an importance function passing the extracted features. The component then returns the score as the image importance score.

Figure 4:
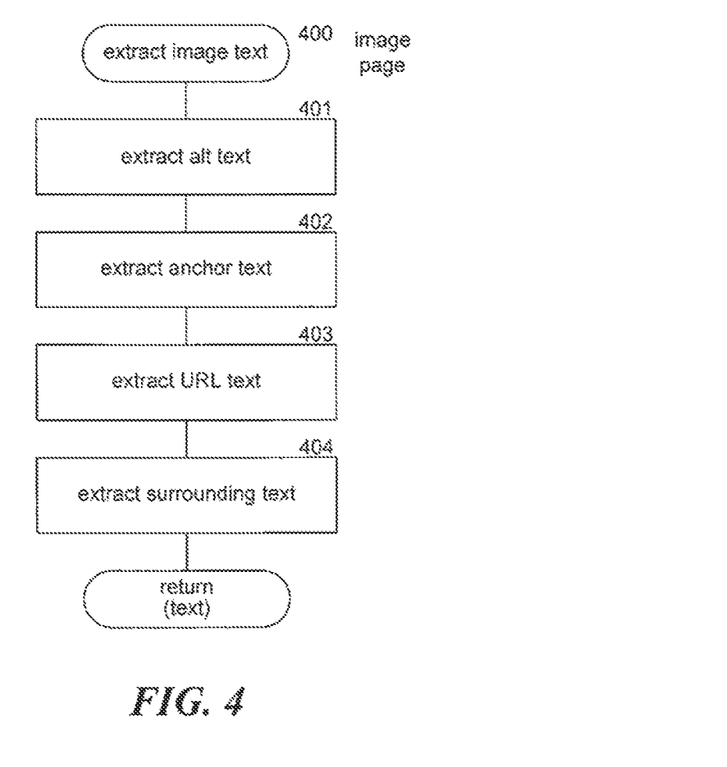
FIG. 4 is a flow diagram that illustrates the processing of the extract image text component of the scoring system in one embodiment.

FIG. 4 is a flow diagram that illustrates the processing of the extract image text component of the scoring system in one embodiment. The component 400 is passed an image and a web page and extracts the image text for the image. In block 401, the component extracts the ALT text of the image. In block 402, the component extracts any anchor text of the image. In block 403, the component extracts text associated with the URL for the image. In block 404, the component extracts text surrounding the image. The component then generates a small structured document that contains the extracted text and returns the structured document.

Figure 5:
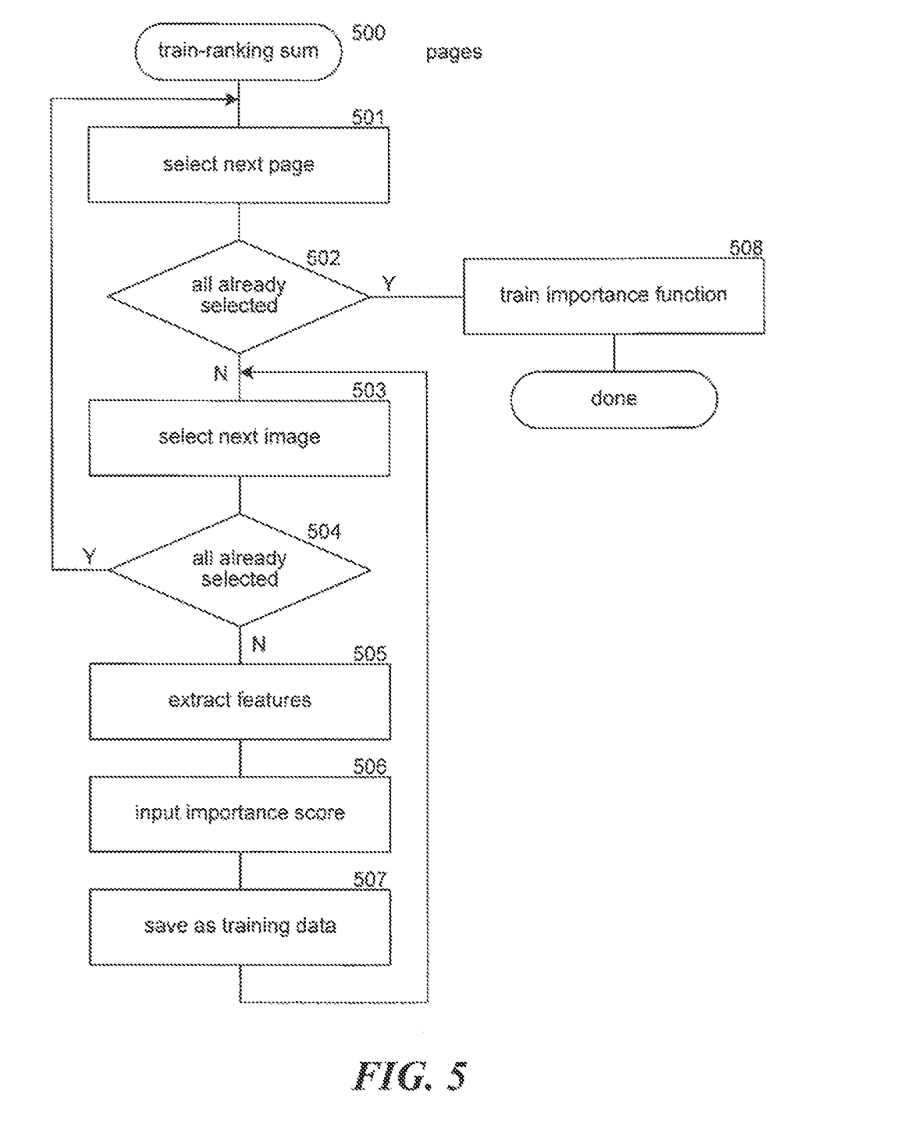
FIG. 5 is a flow diagram that illustrates the processing of the train ranking SVM component of the scoring system in one embodiment.

FIG. 5 is a flow diagram that illustrates the processing of the train ranking SVM component of the scoring system in one embodiment. The ranking SVM is an implementation of the importance function. The component 500 is passed web pages of training data for use in training the importance function. In blocks 501-507, the component loops selecting each web page and each image of each web page and extracting training data. In block 501, the component selects the next web page. In decision block 502, if all the web pages have already been selected, then the component continues at block 508, else the component continues at block 503. In block 503, the component selects the next image of the selected web page. In decision block 504, if all the images of the selected web pages have already been selected, then the component loops to block 501 to select the next web page, else the component continues at block 505. In block 505, the component extracts the image level, page level, and site level features of the selected image. In block 506, the component inputs an image importance score as a label for the selected image. In block 507, the component saves the extracted features and the input image importance score as training data and then loops to block 503 to select the next image of the selected web page. In block 508, the component trains the importance function using the saved training data and then completes.

Figure 6:
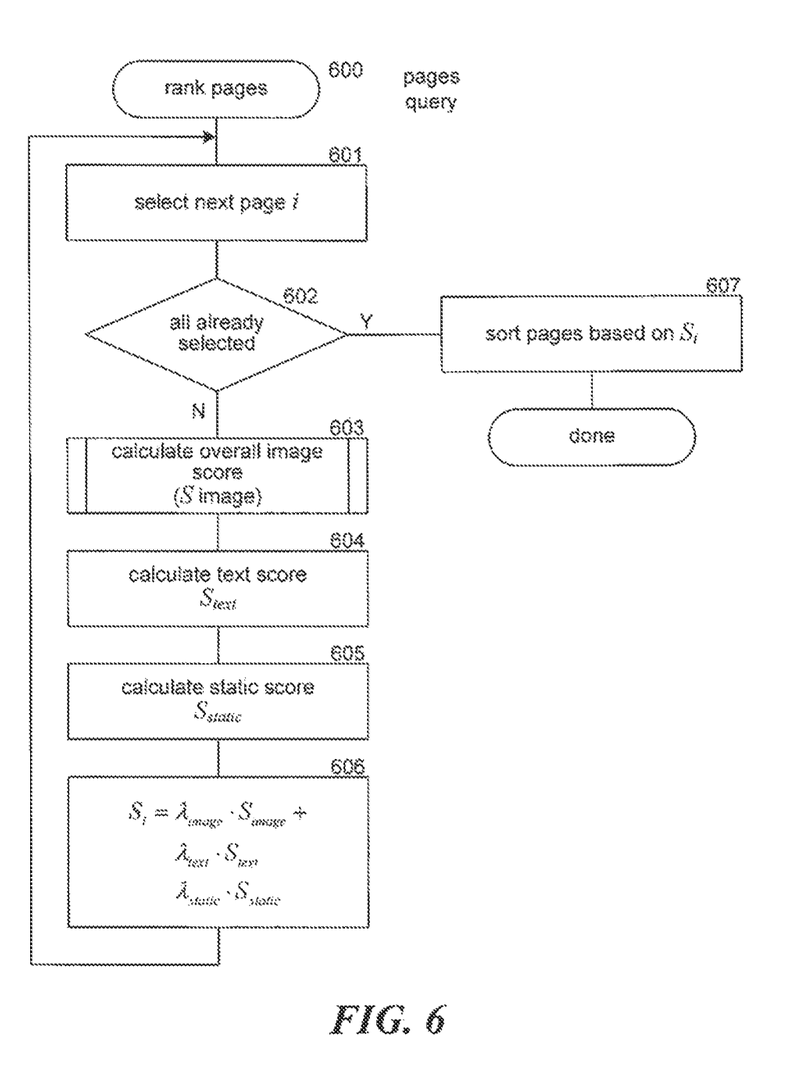
FIG. 6 is a flow diagram that illustrates the processing of the rank pages component of the scoring system in one embodiment.

FIG. 6 is a flow diagram that illustrates the processing of the rank pages component of the scoring system in one embodiment. The component 600 is passed web pages of a search result along with the search request and ranks the web pages based in part on image relevance to the search request. In block 601, the component selects the next web page. In decision block 602, if all the web pages have already been selected, then the component continues at block 607, else the component continues at block 603. In block 603, the component invokes the calculate overall image score component to calculate the overall image score for the selected web pages. In block 604, the component calculates a text score for the selected web page. In block 605, the component calculates a static score for the selected web page. In block 606, the component linearly combines the overall image score, the text score, and the static score to give a ranking score for the selected web page. In block 607, the component sorts the web pages based on their ranking scores and then returns an indication of the sorted web pages.

Figure 7:
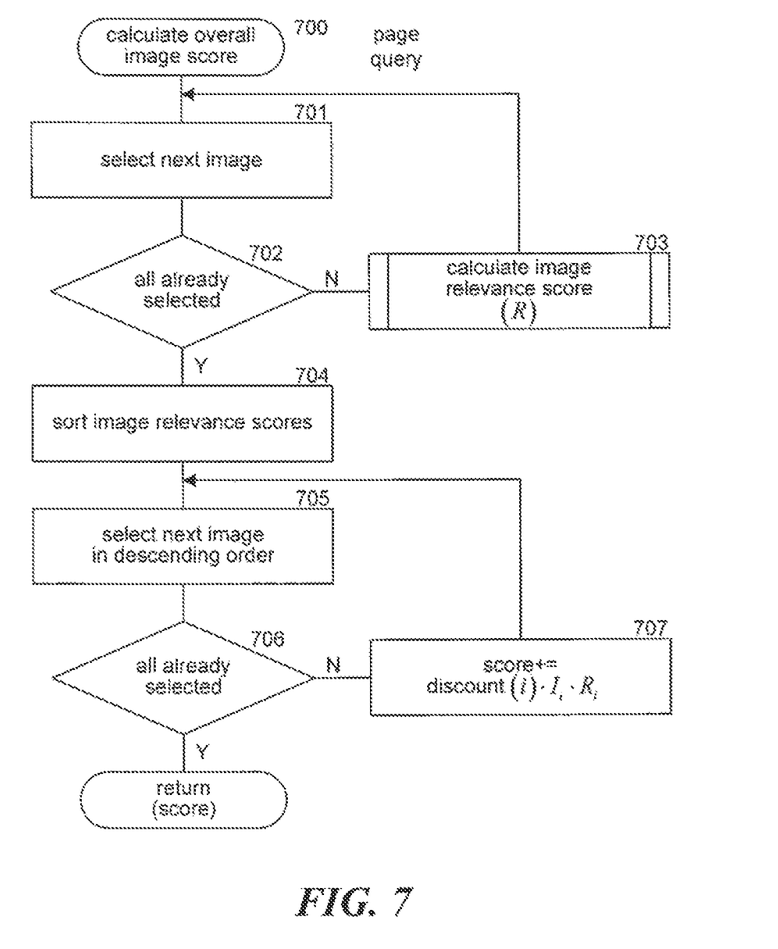
FIG. 7 is a flow diagram illustrating the processing of the calculate overall image score component of the scoring system in one embodiment.

FIG. 7 is a flow diagram illustrating the processing of the calculate overall image score component of the scoring system in one embodiment. The component 700 is passed a web page and a query and calculates the overall image score for the web page. In blocks 701-703, the component loops calculating the image relevance score for each image of the web page. In block 701, the component selects the next image of the web page. In decision block 702, if all the images of the web page have already been selected, then the component continues at block 704, else the component continues at block 703. In block 703, the component invokes the calculate image relevance score component to calculate the image relevance score for the selected image. The component then loops to block 701 to select the next image. In block 704, the component sorts the images in descending order of a non-discounted image score (i.e., image importance score times image relevance score). In blocks 705-707, the component loops calculating a discounted image score for each image. In block 705, the component selects the next image. In decision block 706, if all the images have already been selected, then the component returns the discounted image scores, else the component continues at block 707. In block 707, the component calculates a discounted image score for the selected image where i represents the position of the selected image in the list of the sorted images. The component then loops to block 705 to select the next image.

Figure 8:
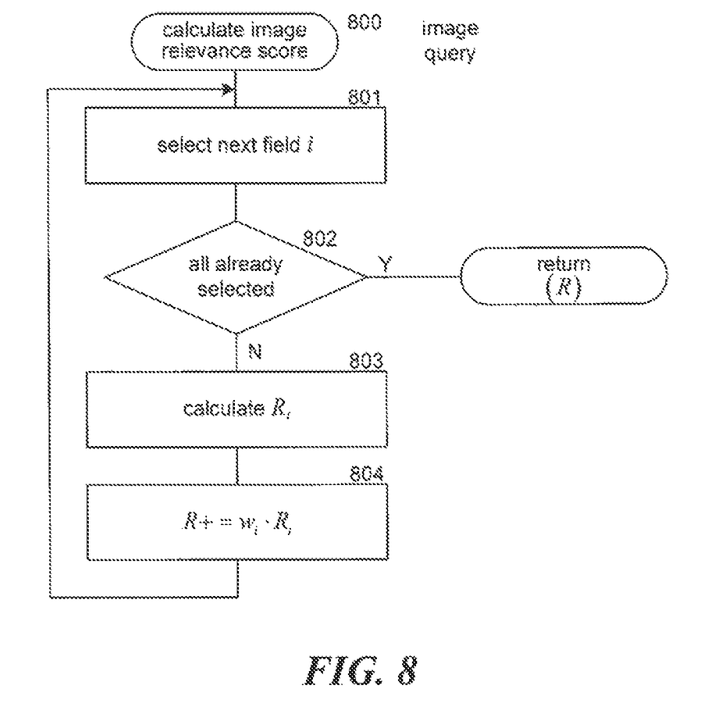
FIG. 8 is a flow diagram that illustrates the processing of the calculate image relevance score component of the scoring system in one embodiment.

FIG. 8 is a flow diagram that illustrates the processing of the calculate image relevance score component of the scoring system in one embodiment. The component 800 is passed an image and a query and calculates an image relevance score indicating the relevance of the image to the query. In block 801, the component selects the next field of the image. In decision block 802, if all the fields have already been selected, then the component returns the accumulated image relevance score, else the component continues at block 803. In block 803, the component calculates a field relevance score for the selected field to the query. In block 804, the component accumulates the image importance score as a weighted sum of the field relevance scores of the fields of the selected image. The component then loops to block 801 to select the next field of the image.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A computing device for determining relevance of a document to a text string, the document containing text and images, the text and the text string having terms, the document having a layout when the document is rendered, comprising:
   a memory storing computer-executable instructions implementing
      a component that, for each of a plurality of images contained in the document, identifies text associated with the image by extracting from the document that portion of the text that is determined to be adjacent to the image based on analysis of the layout of the document when the document is rendered;
      a component that, for each of the plurality of images, calculates a text score indicating relevance of the identified text associated with the image to the text string based on comparison of terms of the identified text to terms of the text string; and
      a component that determines relevance of the document to the text string based on the calculated the text score indicating relevance of the identified text associated with each of the plurality of images to the text string and factoring in an image importance score for each of the plurality of images that indicates importance of the image to the document; and
   a processor for executing the instructions stored in the memory.

2. The computing device of claim 1 wherein the document is a web page and the identified text includes metadata of the image.

3. The computing device of claim 1 wherein the importance of the image is determined using an importance function that is trained to determine the importance of images to documents.

4. The computing device of claim 3 wherein the document is a web page and the importance of the image is based on image level features, document level features, and site level features.

5. The computing device of claim 1 wherein the component that determines relevance of the document to the text string is further based on relevance of text content of the document to the text string.

6. The computing device of claim 1 including a component that ranks documents based on their determined relevance.

7. The computing device of claim 6 wherein the documents that are ranked are results of a search with the text string as the search request.

8. A computer-readable storage device containing computer-executable instructions for controlling a computing device to determine relevance of a document to a text string, the document containing text and a plurality of images, the text and the text string having terms, the document having a layout when the document is rendered, by a method comprising:

for images of the document, calculating an image importance score indicating importance of the image to the document;

selecting the image of the document with the highest image importance score;

identifying image text of the document, the image text of the document being a subset of text of the document that is determined to be associated with the selected image by analyzing the layout of the document;

calculating a text score indicating relevance of the image text to the text string based on comparison of terms of the image text to terms of the text string; and determining relevance of the document to the text string based on the relevance of the image text to the text string as indicated by the text score such that the image text is the subset of text of the document that is determined to be associated with the selected image that has the highest image importance score.

9. The computer-readable storage device of claim 8 wherein the image text is a caption for the image.

10. The computer-readable storage device of claim 8 wherein the image text is metadata associated with the selected image.

11. The computer-readable storage device of claim 8 wherein the image text is adjacent to the selected image.

12. The computer-readable storage device of claim 8 wherein the image importance score indicates the importance of an image to the document is determined using an importance function that is trained to determine the importance of images to documents.

13. The computer-readable storage device of claim 12 wherein the document is a web page and the importance of an image is based on image level features, document level features, and site level features.

14. A method in a computing device for determining relevance of web pages to queries, the web pages containing text and images, each web page having a layout when the web page is rendered, the method comprising:

for images of web pages, identifying image text associated with the image by extracting from the web page that contains the image the image text that is determined to be associated with the image based on analysis of the layout of the web page that contains the image;

receiving a query;

generating a search result of web pages for the received query;

for each web page in the generated search result,
calculating an image relevance score indicating relevance of image text associated with an image of the web page to the query; and
calculating an image importance score for the image of the web page indicating importance of the image to the web page; and ranking the web pages of the generated search result based on the calculated image relevance scores and the calculated image importance scores.

15. The method of claim 14 wherein when a web page has multiple images, the web pages are ranked based on the image relevance score of the image of the web page with the highest image importance score.

16. The method of claim 15 wherein the image importance score for an image is based on image level features, document level features, and site level features.

17. The method of claim 14 wherein the extracting of the image text is based on a technique for identifying surrounding text of an image that is selected from a group consisting of a technique that renders a web page in memory and analyzes the layout of the rendered web page, a technique that is based on rules applied to an HTML document representing a web page, and a technique that uses a document object model to represent a web page as a tree of nodes.

* * * * *